United States Patent Office 2,698,314
Patented Dec. 28, 1954

2,698,314

REACTION OF ALKOXY SILANES WITH SILANE HYDROLYSIS PRODUCTS

John B. Rust, Verona, N. J., assignor of one-half to Montclair Research Corporation, a corporation of New Jersey, and one-half to Ellis-Foster Company, a corporation of New Jersey No Drawing. Application March 12, 1951,
Serial No. 215,195

17 Claims. (Cl. 260—46.5)

This invention relates to organo substituted silicon copolymers and to methods of making them as well as to their utilization.

This application is a continuation-in-part of application Serial No. 732,937 now Patent No. 2,562,953 which latter continued subject matter in part from Serial No. 541,846 filed June 23, 1944, now abandoned.

Esters of silicic acids of various types or what may otherwise be called alkoxy or aroxy silanes and related compounds have been utilized in the production of organo silicon copolymers by utilization of hydrolysis reactions in which the hydrocarbonoxy groups are at least partially hydrolyzed as a means of producing the condensation reactions. But there are limitations in such procedures to the character of products that can be obtained and on the properties of the products so produced.

Among the objects of the present invention is the production of organo silicon copolymers from esters including alkoxy and aroxy silicon derivatives without requiring hydrolysis of such derivatives prior to or during the initial polymerization, resinification or gel-forming steps.

Further objects and advantages of the present invention will appear from the more detailed description set forth below, it being understood that such more detailed description is given by way of explanation and illustration only, and not by way of limitation, since various changes therein may be made by those skilled in the art without departing from the scope and spirit of the present invention.

In accordance with this invention, copolymers are produced by reaction of a halogen hydrolyzed organo silicon halide in which the halogen is desirably chlorine or bromine and the organo group is a monovalent hydrocarbon radical such as alkyl, alkenyl, cycloalkyl, cycloalkenyl, aryl, aralkyl, alkaryl, etc., with unhydrolyzed silane derivatives having the formula $R'_{4-x-y}H_ySi(OR)_x$ or $(RO)_xSiR'_{4-x}$ where R and R' are monovalent groups as set forth above, $x$ is from 1 to 4, $y$ is from 0 to 2, and $x+y$ does not exceed 4. The reaction is generally carried out by heating the reactants together to form a copolymer which may be an oil, a soft gel, a hard rubbery gel, a brittle resin, etc., depending on the reactants, the proportions, and the conditions of reaction, as well as the after treatment given to the copolymer.

The halogen hydrolyzed organo silicon halide includes compounds containing a hydroxyl group attached to silicon whether monomeric or polymeric. Where the hydroxyl containing compound exists per se as a separate entity as for example in the monosilanols and certain silicon diols, such compounds may be used as one of the reactants whether made by hydrolysis of a halogen or in any other way. Where however the halogen hydrolyzed halide condenses so that water is split off, as in certain silane diols and silane triols, the reaction mixture in which the hydrolysis of the halide has taken place may be used without any attempt to segregate individual halogen hydrolyzed products. Such hydrolysis products will usually include a mixture of products one or more of which enter into reaction. In all cases there will be one or more hydrocarbon groups attached to the silicon depending on the type of derivative subjected to hydrolysis or from which the silaneol, diol or "triol" is derived. These silanols may generally be formulated as $R_{4-x-y}H_ySi(OH)_x$ where R is a monovalent hydrocarbon group as defined above and illustrated hereafter, $x$ is from 1 to 3 it being understood that some diols and triols spontaneously condense, $y$ is from 0 to 2, and $x+y$ is not greater than 4, usually R being present as at least a monosubstituent.

The hydrocarbon groups attached to silicon in such halogen hydrolyzed organo silicon halides may be of any desired type including alkyls such as methyl, ethyl, propyl, isopropyl, butyl, isobutyl, tertiary butyl, amyl, iso amyl, and the various other amyl groups, hexyl, heptyl, octyl, decyl, dodecyl, tetradecyl, hexadecyl, octadecyl, etc. groups; alkenyl groups including vinyl, allyl, methallyl groups; cycloalkyl such as cyclobutyl, cyclopentyl, cyclohexyl, cycloheptyl, cyclo octyl, etc. groups; cycloalkenyl groups such as cyclobutenyl, cyclopentenyl, cyclohexenyl, etc.; aryl such as phenyl, tolyl, xylyl, etc.; aralkyl like benzyl; etc.

As exemplary of particular derivatives that may be used there may be mentioned trimethyl solanol, triethyl silanol, tripropylsilanol, triamylsilanol, tri-iso-amylsilanol, triphenyl silanol, tri-para-tolyl silanol, tribenzyl silanol, and mixed monosilanols such as methylethylphenylsilanol, diethylphenylsilanol, ethylpropylphenylsilanol, methyldibenzylsilanol, ethyldibenzylsilanol, diethylbenzylsilanol, dimethyldichloromethylhydroxysilane, phenyloxohydroxy silane, alpha chloroethyldiethyl hydroxy silane, diisopropylhydroxy silane, alpha naphthyloxohydroxy silane, benzylethylmethylhydroxy silane, dicyclohexylphenyl silanol, tribenzyl silanol; diols such as diethyldihydroxy silane, diphenyldihydroxy silane, ethyl phenyldihydroxy silane, benzylethyldihydroxy silane, benzylphenyldihydroxy silane, diparatolyldihydroxy silane, cyclohexylphenyldihydroxy silane, dicyclohexyldihydroxy silane, 1,2 dimethyl-1,2 diphenyl-disilane-1,2 diol, and 1,3 diethyl-1,3 diphenyl-disiloxane-1,3 diol; and halogen hydrolysis products of alkyl silicon trihalides, aryl silicon trihalides, cycloalkyl silicon trihalides, and mixtures of them with dialkyl or diaryl etc. silicon dihalides or trialkyl or triaryl silicon halides, etc.; for example the halogen hydrolysis product of n-butyl silicon trichloride, the halogen hydrolysis product of the reaction product of ethyl bromide and n-butyl bromide with silicon tetrachloride in the molar ratio of .5:.75:1.0; the halogen hydrolysis product of ethyl silicon trichloride, the halogen hydrolysis product of diethyl dichlor silane; etc.

In the unhydrolyzed silane derivative reactant which contains at least one RO— group attached to silicon and may therefore be called an ester, any such compounds containing from one to four of such RO— groups attached to silicon in which R may be any monovalent hydrocarbon group as set forth above for the first mentioned reactant, may be employed; and here too polysilane derivatives may be used as well as monosilane compounds. These compounds may be formulated as $R_{4-x-y}H_ySi(OR')_x$ where R and R' are monovalent hydrocarbon radicals as defined above and illustrated herein, $x$ is from 1 to 4, $y$ is from 0 to 2, and $x+y$ is not greater than 4. Where no hydrogen is present the formulation may be $R_{4-x}Si(OR')_x$ where R, R' and $x$ have the values set forth above.

These compounds are well illustrated by the orthosilicates of alkyl, aryl, cycloalkyl, alkenyl, cycloalkenyl, etc. but other analogous compounds may be used as for example trialkylalkoxy silanes. There may be mentioned trimethyl-methoxy, -ethoxy, -butoxy silanes, triethylethoxy silane, triisopropylethoxy silane, phenyldicyclohexyl-cyclohexoxy silane; dialkoxy silanes including diethyl dimethoxy silane, dimethyl-, diethyl-, methyl-, phenyl-, diphenyl-diethoxy silanes, dimethyl dibutoxy silane, dimethylethoxybutoxy silane, diaryloxy silanes including diethyldiphenoxy silane, diphenyldiphenoxy silane, and dibenzyldiphenoxy silane; trialkoxy silanes including ethyl trimethoxy silane, methyl-, ethyl-, phenyl-, tolyl-, diphenyl-triethoxy silanes, methyl-, ethyl-, phenyl-tributoxy silanes, alpha naphthyltriethoxy silane, ethyltriamoxy silane, dimethyl phenyltriethoxy silane, aryloxy silanes such as phenyltriphenoxy silane, etc.; tetraalkoxy silanes such as tetramethoxysilane, tetraethoxy silane, tetrapropoxy silane, tetrabutoxy silane, tetraalloxy silane, tetracrotonoxy silane, alloxytrimethoxy silane, furfuroxytriethoxy silane; alloxy-, amoxy-, butoxy-triethoxy silanes; methoxy-, ethoxy-, propoxy-, butoxy-, cyclohexoxy-, cetoxy-triallloxy silanes; methoxytricrotoxy silane, ethoxytributoxy silane; triethoxy-, tripropoxy-; and tributoxy silanes; dialloxy-, dicrotonoxy-dimethoxy silanes; dialloxy-, dicrotoxy-, dibutoxy, difurfuroxy-diethoxysilanes; dialloxy di-i-propoxy silane, dialloxy dibutoxy silane, dialloxydicyclohexoxy; tetraphenoxy silane etc.

Where the reactants are liquids they may be intermixed and heated together or one dissolved in the other. Where one reactant is a solid it may be dissolved in the other. Or a common solvent may be used such as a hydrocarbon liquid. Or suspensions of one reactant in the other or in a suspending organic liquid medium may be used. And one or more of the halogen hydrolysis derivatives may be reacted with one or more of the ester type derivatives, the complexity of the products increasing very materially where either or both of the reactants is a mixed type of derivative or a mixture of derivatives.

To illustrate one type of reaction possible under the present disclosure, the following formulation will serve:

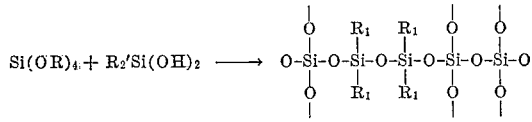

Illustrating some specific examples, copolymers may be produced by following the specific examples given below utilizing ethyl orthosilicate reacted with ethyl silicon trihydroxide, methyl silicon trihydroxide, dimethyl silicon dihydroxide, trimethyl silicon hydroxide, diethyl silicon dihydroxide, or triethyl silicon hydroxide, or mixtures of two or more of these hydroxides.

The two types of reactants or mixtures of several of each of the two groups of reactants may be employed in varying proportions. Where they are liquid they may be utilized in desired volume ratios with respect to one another, as for example, from 1 to 10 volumes of one of the reactants from the ester derivative group with from 10 to 1 volumes of the reactant or reactants from the organic substituted hydroxy silicon derivatives group. Or from 10 to 90% parts by weight of the derivative or derivatives of the ester derivatives group may be employed with 90 to 10 parts by weight of the derivative or derivatives from the organic substituted hydroxy-silicon derivatives groups. Or molar ratios may be employed, as for example, from 1 to 10 moles of the derivative or mixture of derivatives from the ester derivatives groups with from 10 to 1 moles of the derivative or derivatives from the organic substituted hydroxysilicon derivatives group. The reaction of a single ester derivative with a single organic substituted hydroxysilicon derivative enables close control of the reaction product to be produced. More complex mixtures enable variation in properties to be obtained but as great control cannot be exercised as in those cases where the nature of the reactants is more limited.

As a general rule, an alkyl/silicon ratio of less than 2 will give hard resins, whereas an alkyl/silicon ratio of greater than 2 will give products that vary from flexible materials to oils.

In general the reaction is carried out by heating the components together at an elevated temperature desirably above 100° C. up to the boiling points of compounds involved but the temperatures employed should be below any decomposition temperatures. Depending on the nature of the materials employed the reaction temperatures may run up to high temperatures such as 300° C. and even higher and in some cases superatmospheric pressures may be employed to prevent undue vaporization or loss of materials before reaction. Where heat is used, the temperature will be limited by that at which any liquid or solvent present refluxes, unless superatmospheric pressure is employed. The time involved will necessarily depend on the conditions of reaction and the materials undergoing treatment but is relatively short and may run from 2 or more hours to 16 hours and up. Where the materials are subjected to curing as in coatings, in molded products, and so forth, the temperatures and times may be from 100-300° C., and from 10 minutes to 4 hours respectively.

The products of the present invention may be utilized in a variety of ways. They may be partially polymerized, dissolved in a solvent and applied as a surface coating to metallic or wooden or other surfaces and thereafter completely converted by any suitable means such as application of heat to their final desired condition. They may be used to impregnate sheet material for electrical insulation, or they may be used in general as lacquers. They may be mixed with fillers, both organic and inorganic, and molded under heat and pressure. The materials of the invention may be used very satisfactorily as paints and as sanding sealers. They may be blended with other resins such as urea-formaldehyde, cumarone-indene, phenolic-aldehyde, alkyd resins, vinyl resins, styrene resins, allyl dibasic acid resins, acrylate and methacrylate resins, other organo silicon derivatives, and resins, cellulose ethers such as ethyl cellulose, cellulose esters such as cellulose nitrate, cellulose acetate, cellulose acetate butyrate, etc., as well as with drying and semi-drying oils such as China-wood oil, linseed oil, perilla oil, and the like.

*Example 1.*—Equal volumes of "n-butyl silicon trihydroxide" (the halogen hydrolysis product of n-butyl silicon trihalide) and ethyl orthosilicate are mixed together and heated to 140° C. An evolution of gas occurs. When the evolution of gas has diminished, a soft gel is obtained. On continued heating a hard rubbery gel is produced.

*Example 2.*—Ethylorthosilicate is heated with the halide hydrolysis product of the alkyl silicon halide (obtained from 0.5 mole of ethyl bromide, 0.75 mole n-butyl bromide and 1 mole of silicon tetrachloride by refluxing in the presence of magnesium) in the ratio by weight of 1:2, at a temperature of 130° C. to produce a gel.

*Example 3.*—Ethylorthosilicate, diethyldiethoxysilane and the halide hydrolysis product of triethylchlorosilane (triethyl silicon hydroxide) were heated in the molar ratio of 1:2:3 at a temperature of 160° C. to produce a copolymer.

*Example 4.*—Ethylorthosilicate and the halide hydrolysis product of diethyl silicon dichloride are heated together in the molar ratio of 3:1 at a temperature of about 150° C. until a soft copolymer is produced.

*Example 5.*—A mixture of phenyl triethoxy silane and the halide hydrolysis product of dimethyl silicon dichloride in the mole ratio of 2:1 was heated at 140° C. until the somewhat viscous initial reaction product is converted into a solid copolymer. It may be hardened further by heating for several hours preferably at a somewhat higher temperature.

*Example 6.*—A mixture of methyltriethoxysilane and diphenyldihydroxysilane was heated to 160° C. in the ratio of 4:1 to give a firm copolymer.

*Example 7.*—Methyltriethoxysilane and benzylethyldihydroxysilane in the molar ratio of 1:1 were mixed and heated at 140° C. until a resinous product was obtained.

*Example 8.*—Phenyl methyl diethoxy silane and the halogen hydrolysis product of phenyl silicon trichloride were heated together in the molar ratio of 2:1 at a temperature of 160° C. until a soft gel was obtained.

*Example 9.*—A mixture of dimethyl diethoxy silane and the halogen hydrolysis product of methallyl silicon trichloride was heated at 160° C. in a molar ratio of 1:1 until a resinous copolymer was produced.

*Example 10.*—Trimethyl ethoxy silane and dicyclohexyl dihydroxy silane in the molar ratio of 2:1 was heated at 150° C. until a relatively hard copolymer was produced.

Similarly any of the reactants set forth earlier herein may be substituted for its corresponding component in the examples given above to produce a wide variety of products. Liquid or soft copolymers can generally be hardened by further heat treatment desirably at a somewhat higher temperature than that used in their formation.

Where the products obtained by heating the reactants as illustrated above, still retain hydrolyzable groups, they may be subjected to hydrolysis to modify their properties further. Such final products are however structurally different from reaction products produced initially by hydrolysis just as the initial reaction products are substantially different from products produced by hydrolysis reactions.

Having thus set forth my invention, I claim:

1. The method of producing a copolymer which comprises heating together as the sole reactants a halogen hydrolyzed monovalent hydrocarbon silicon halide with an unhydrolyzed silane derivative having the formula $R'_{4-x-y}H_ySi(OR)_x$ where R and R′ are monovalent hydrocarbon groups, $x$ is from 1 to 4, $y$ is from 0 to 2, and $x+y$ does not exceed 4, in the molar ratios of from 10:1 to 1:10 to form a copolymer.

2. The method as set forth in claim 1 in which the monovalent hydrocarbon group in the halide is aliphatic.

3. The method as set forth in claim 1 in which the monovalent hydrocarbon group in the halide is alkyl.

4. The method as set forth in claim 1 in which the monovalent hydrocarbon group in the halide is alkenyl.

5. The method as set forth in claim 1 in which the monovalent hydrocarbon group in the halide is aryl.

6. The method as set forth in claim 1 in which R is alkyl.

7. The method as set forth in claim 1 in which R is alkenyl.

8. The method as set forth in claim 1 in which R is aryl.

9. The method as set forth in claim 1 in which R' is aliphatic.

10. The method as set forth in claim 1 in which R' is alkyl.

11. The method as set forth in claim 1 in which R' is alkenyl.

12. The method as set forth in claim 1 in which R' is aryl.

13. The method as set forth in claim 1 in which a soft copolymer is produced and is heated to convert it into a hard gel.

14. The method of heating a soft copolymer of a halide hydrolyzed monovalent hydrocarbon silicon halide with an unhydrolyzed silane derivative having the formula $(RO)_x SiR'_{4-x}$ where R and R' are monovalent hydrocarbon groups and $x$ is from 1 to 4, in the molar ratio of from 10:1 to 1:10 to form a hard gel.

15. The method of claim 1 in which the halogen hydrolyzed reactant is the halogen hydrolysis product of n-butyl silicon trihalide and the unhydrolyzed reactant is ethyl orthosilicate.

16. The method of claim 1 in which the halogen hydrolyzed reactant is the halogen hydrolysis product of phenyl silicon trichloride and the unhydrolyzed reactant is phenyl methyl diethoxy silane.

17. The method of claim 1 in which the halogen hydrolyzed reactant is the halogen hydrolysis product of methallyl silicon trichloride.

References Cited in the file of this patent

UNITED STATES PATENTS

| Number | Name | Date |
|---|---|---|
| 2,397,895 | Warrick | Apr. 2, 1946 |
| 2,469,888 | Patnode | May 10, 1949 |
| 2,486,162 | Hyde | Oct. 25, 1949 |
| 2,530,635 | Sowa | Nov. 21, 1950 |
| 2,550,003 | Daudt | Apr. 24, 1951 |
| 2,562,953 | Rust | Aug. 7, 1951 |